(12) United States Patent
Fensch et al.

(10) Patent No.: US 6,307,864 B1
(45) Date of Patent: Oct. 23, 2001

(54) PROCESS AND DEVICE FOR THE BASEBAND TRANSCODING OF DIGITAL INFORMATION

(75) Inventors: Thierry Fensch; Gérald Kohlenberger, both of Grenoble; Céline Cornu, Saint Egréve, all of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/149,215

(22) Filed: Sep. 8, 1998

(30) Foreign Application Priority Data

Sep. 8, 1997 (FR) .................................... 97 11137

(51) Int. Cl.[7] ...................................... H04J 3/16
(52) U.S. Cl. .................. 370/465; 370/466; 370/467; 137/317
(58) Field of Search .................. 370/465, 466, 370/467; 375/137

(56) References Cited

U.S. PATENT DOCUMENTS

| | | | |
|---|---|---|---|
| 4,896,335 | * | 1/1990 | Wong et al. ............... 375/17 |
| 5,099,497 | * | 3/1992 | Ohno et al. ............... 375/20 |
| 5,249,179 | * | 9/1993 | Koyama ..................... 370/286 |
| 5,978,390 | * | 11/1999 | Balatoni .................... 370/540 |
| 5,999,542 | * | 12/1999 | Turner et al. ............. 370/497 |

FOREIGN PATENT DOCUMENTS

| | | |
|---|---|---|
| 2 063 023 | 5/1981 | (GB) . |
| 56114464 | 9/1981 | (JP) . |
| 57031251 | 2/1982 | (JP) . |

OTHER PUBLICATIONS

Batruni et al. "Mixed Digital/Analog Signal; Processing for a Single–Chip 2B1Q U–Interface Transceiver", IEEE Journal of Solid–State Circuits, vol. 25, No. 6, pp. 1414–1425, Dec. 1990.

French Search Report (Jun. 5, 1998).

* cited by examiner

*Primary Examiner*—Hassan Kizou
*Assistant Examiner*—T T (57) ABSTRACT

The symbols of a first code are represented by sign and magnitude bits in a manner analogous to the sign and magnitude bits representing the symbols of a second code. A memory stores digital samples partially representing coding pulses, and each pair of sign and magnitude bits is used to control a common shaping filter. The shaping filter uses the samples stored in the memory to generate a sampled digital signal representative of the analog signal transmitted over the telephone line.

22 Claims, 5 Drawing Sheets

PROCESS AND DEVICE FOR THE BASEBAND TRANSCODING OF DIGITAL INFORMATION

CROSS-REFERENCE TO RELATED APPLICATIONS

This application is based upon and claims the benefit of the priority of the prior French patent application 97 11137 filed on Sep. 8, 1997, the contents of which are incorporated herein.

BACKGROUND OF THE INVENTION

1. Field of the Invention

The present invention relates to information coding, and more specifically to the baseband transcoding of digital information that is to be transmitted over a telephone line.

2. Description of the Related Art

Conventional baseband transcoding has two steps: a coding step that associates a predetermined symbol with a sequence of digital information, and a shaping step that associates an elementary pulse of predetermined duration with each coded symbol. Among the codes typically used is a first type known as 2B1Q (defined in the European standard ETSI ETR 080 and the American standard ANSI T1.601) and a second type known as 4B3T (defined in the European standard ETSI ETR 080 and the German standard FTZ 1 TR 220. The codes are used for the transmission of digital information within a digital network of universal character, such as an integrated services digital network ("ISDN") (defined in the European standard ETSI ETR 080 and the American standard ANSI T1.601.

The three main characteristics of ISDN are: (1) the capability of simultaneously employing telephone, telematic, and even video-communication services from one access; (2) subscriber-to-subscriber integral digital transmission with digital connections in the various switching centers; and (3) signaling in message mode only between the various functional entities (e.g., terminals, switches, and servers). The architecture of the local network attaching users to an ISDN network includes: on the subscriber side, a network digital terminal (TNR) to which the various user terminals are attached, and on the switch side, a line terminal (TL) that provides substantially the same functions as the TNR terminal. Between the TNR terminal and the TL terminal there is a subscriber line (U interface) that consists of a pair of copper cables whose characteristics (e.g., maximum length, useful bit rate, and error rate) are standardized.

The useful bit rate with ISDN is 144 Kbits/s, which is used by two "B" channels operating at 64 Kbits/s for transporting useful information and a "D" channel operating at 16 Kbits/s for transporting check bits. Thus, the subscriber line alone provides the so-called "narrow band" ISDN connection that allows access at the basic bit rate (2B+D) of 144 Kbits/s. By using codes such as the 4B3T code or the 2B1Q code, it becomes possible to reduce the spectral band used for transmission.

Transmitters operating with either the 2B1Q code or the 4B3T code are known. However, when using a particular baseband transcoding, it is necessary to use a network digital terminal containing a coder specific to the type of coding employed. Thus, changing the type of coding requires replacing the network digital terminal with another network digital terminal that is specifically adapted for use with the new code.

SUMMARY OF THE INVENTION

The present invention provides a switchable device for baseband transcoding that allows a single circuit containing a common filter for shaping symbols to go from one code to another code. In a preferred embodiment, the device can switch between the 2B1Q code and the 4B3T code.

One embodiment of the present invention provides a device for the baseband transcoding of digital information that is to be transmitted over a telephone line within an analog signal delivered to the line transformer and consisting of pulses associated with symbols obtained through the coding of the digital information. The device includes a preprocessing circuit that, in the presence of a first value of a selection signal, extracts first successive pairs of bits each containing a first "sign" bit and a second "magnitude" bit from the digital information at a first frequency so as to form for each first pair one of the symbols of a first type of baseband coding. The preprocessing circuit also, in the presence of a second value of the selection signal, performs a second type of coding and delivers at a second frequency each of the symbols of the second type of coding in the form of a second pair of bits containing a first "sign" bit and a second "magnitude" bit of predetermined values. Stated otherwise, irrespective of the value of the selection signal (and thus the type of coding selected), the preprocessing circuit delivers pairs of sign bits and magnitude bits even though conventional 4B3T coding does not provide for designating each of the possible symbols of the code by a pair of bits.

In a second embodiment, the transcoding device also includes first and second memories respectively containing first and second digital samples representative of at least a part of the predetermined pulses that are associated with the symbols of the first and second types of coding.

In a third embodiment, the transcoding device also includes a shaping filter that reads the contents of the first or second memory at the same reading frequency irrespective of the value of the selection signal, and that uses the contents of the corresponding memory and the successive values of the magnitude and sign bits to derive a digital output signal sampled at the reading frequency. The digital output signal is compatible with the coding selected and is representative of the corresponding analog transmission signal. Therefore, a sign bit and a magnitude bit of predetermined values are associated with each symbol of the 4B3T code so as to effect a parallel with the sign and magnitude bits used in the 2B1Q code. Additionally, the sign bit is regarded as a unique first control bit for the common shaping filter and the magnitude bit is regarded as a unique second control bit for the common shaping filter irrespective of the type of coding selected. Further, the shaping filter reads the stored samples at the same reading frequency and the sampled digital output signal is delivered at this same reading frequency, irrespective of the coding used. However, the successive values of the sign and magnitude bits are delivered at different delivery frequencies for the two types of coding.

In a fourth embodiment, all the digital samples stored in the first and second memories are obtained through two different samplings of the same mathematical function. For example, a raised cosinusoid elevated to an integer power (e.g., the power of 4) could be used. Moreover, the product of each frequency of delivery times the number of samples representative of a pulse of the type corresponding to the coding considered is equal to the reading frequency. This makes it possible to use the same basic mathematical function to digitally generate the various pulses of the two types of coding, even though the pulses do not have the same time duration. For example, all the pulses corresponding to the symbols of the 2B1Q coding have a time duration of 25 ps and all the pulses associated with the symbols of the 4B3T coding have a time duration of 16.66 ps. Thus, in practice, 24 samples can be stored to represent one pulse of the 2B1Q type and 16 samples can be stored to represent one pulse of the 4B3T type.

Furthermore, the two frequencies of delivery of the symbols for the two types of coding correspond to a time period of delivery equal to half the duration of the selected pulses of the type of coding. Stated otherwise, for each type of coding, the duration of a symbol is equal to half of the duration of the corresponding pulse. Also, the shaping filter derives the samples of the corresponding output signal at the selected frequency by adding together at the reading frequency samples drawn from the digital samples relating to the current symbol and samples drawn from the digital samples relating to the preceding symbol.

In a preferred embodiment, the shape of the pulses is chosen such that irrespective of the type of coding used, each nonzero pulse has symmetric front and rear edges extending temporally over the first and second halves of the corresponding pulse time duration. Also, in order to minimize the memory size, the first and second memories only contain samples relating to one of the two edges of each nonzero pulse of predetermined polarity (e.g., relating to the front edge of the pulse of positive polarity). The shaping filter includes a reconstruction circuit for deriving the samples relating to the other edge of each nonzero pulse of predetermined polarity (e.g., the falling edge of the pulse of positive polarity) as well as the samples relating to the front and rear edges of each nonzero pulse of inverse polarity (e.g., the rising and falling edges of the pulse of negative polarity).

A predetermined table can be used to provide correspondence between the sign and magnitude bit values assigned to the symbols of one type of coding and the values forming the symbols of the other type of coding. Thus, for the 4B3T type of coding, the two pulses of nonzero voltage are assigned sign and magnitude bits equal to those assigned to the two low-level pulses of polarity homologous with the other type of coding, or else to the two high-level pulses of polarity homologous with the other type of coding. For example, the value 1 for the sign bit and I for the magnitude bit are assigned to the symbol +2 of the 4B3T coding, and the value 0 for the sign bit and 1 for the magnitude bit are assigned to the symbol −2. Further, a zero value for the sign and magnitude bits can be assigned to the zero-level pulse of the 4B3T code.

In another preferred embodiment, the preprocessing circuit includes a serial/parallel conversion circuit that, in the presence of the first value of the selection signal, receives the input digital information stream and delivers the pairs of sign and magnitude bits to the shaping filter at the first frequency of delivery. The preprocessing circuit also includes a coder that, in the presence of the second value of the selection signal, extracts successive groups of digital information items from the input digital information stream and delivers pairs of sign and magnitude bits representative of symbols of this second type of coding to the shaping filter at the second frequency of delivery.

The coder includes a main memory addressable by an address word containing the relevant group of digital information items. The memory contains at each address a word containing the values of the pairs of sign and magnitude bits associated with the corresponding sequence of symbols. The coder also includes an addressing circuit for addressing the main memory at a coding frequency equal to one-third of the second frequency of delivery, and a reading circuit for delivering at the second frequency of delivery the pairs of sign and magnitude bits. Moreover, the clock signals corresponding to the coding frequency and the frequency of delivery are mutually out of phase. Thus, in this embodiment, the rising edges of the coding clock coincide with the falling edges of the clock signal associated with the second frequency of delivery.

The present invention also provides a method for the baseband transcoding of digital information that is to be transmitted over a telephone line within an analog signal delivered to the line transformer and consisting of pulses associated with symbols obtained by coding the digital information. According to the method, first and second digital samples representative of at least a part of the various predetermined pulses associated with the various symbols of a first type of coding and of a second type of coding are stored in first and second memories, respectively. The type of coding desired for the transmission is selected and if the first type of coding is selected, first successive pairs of bits each containing a first sign bit and a second magnitude bit are extracted from the stream of digital information at a first frequency of delivery so as to form for each first pair one of the symbols of the first type of coding. Alternatively, if the second type of coding is selected, each of the symbols of this second type of coding is delivered at a second frequency of delivery in the form of a second pair of bits containing a first sign bit and a second magnitude bit having predetermined values. The contents of the first or second memory is read at one predetermined reading frequency irrespective of which coding is selected. Depending on the selection, the contents of the corresponding memory and the successive values of the magnitude and sign bits are used to derive a digital output signal sampled at the reading frequency. This digital output signal is compatible with the coding selected and representative of the corresponding analog transmission signal.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
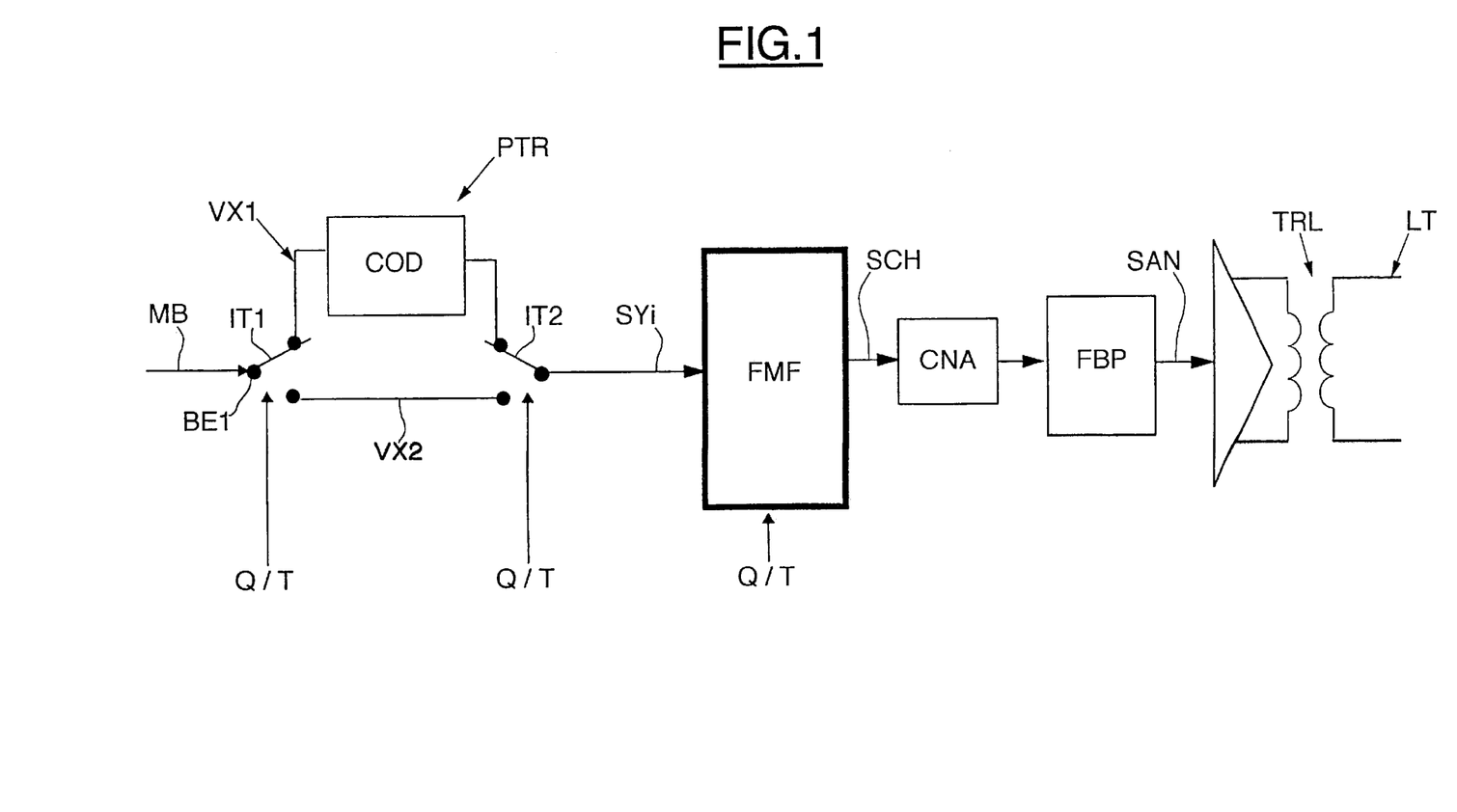
FIG. 1 shows the essential components of a transmitter according to a preferred embodiment of the present invention.

The transmitter represented in FIG. 1 includes a transcoding device that has an input port BE1 for receiving a binary message MB in the form of a stream of digital information at a bit rate of 144 Kbits/s. The transcoding device outputs a sampled digital signal SCH that passes through a digital/analog converter DAC and then through a low-pass analog smoothing filter FBP, which eliminates high-frequency noise. The resulting analog signal SAN is delivered to a line transformer TRL for transmission over a pair of copper wires that form a telephone line LT. The analog signal SAN consists of pulses associated with symbols obtained by coding the digital input information, and the transcoding device includes a preprocessing circuit PTR and a shaping filter FMF. The preprocessing circuit shown in FIG. 1 includes two switchable pathways VX1 and VX2 that are controlled by interrupters IT1 and IT2, which are themselves controlled by a selection logic signal Q/T. (The interrupters IT1 and IT2 may be formed by multiplexers.)

The selection logic signal Q/T allows for the selection of a first type of coding (e.g., the 2B1Q coding) or a second type of coding (e.g., the 4B3T coding). When the 4B3T coding is selected, the digital input information is coded in a coder COD, the structure of which is described below. On the other hand, when the 2B1Q coding is selected, no coder is necessary. Instead, a simple serial/parallel conversion circuit (e.g., a shift register) (not shown) is arranged on the processing pathway VX2 so as to extract successive pairs of bits from the stream of binary input information.

Irrespective of the type of coding used, the preprocessing circuit PTR delivers symbols SYi to the shaping filter FMF from the binary input stream. The shaping filter converts the received symbols into digital pulses so as to form the sampled digital signal SCH. For the 2B1Q coding, the symbols are delivered at a first frequency of delivery (e.g., 80 KHz), and for the 4B3T coding, the symbols are delivered at a second frequency of delivery (e.g., 120 KHz). The selection logic signal Q/T enables the structure of the common filter FMF to be made compatible with either of the codings.

Figure 2:
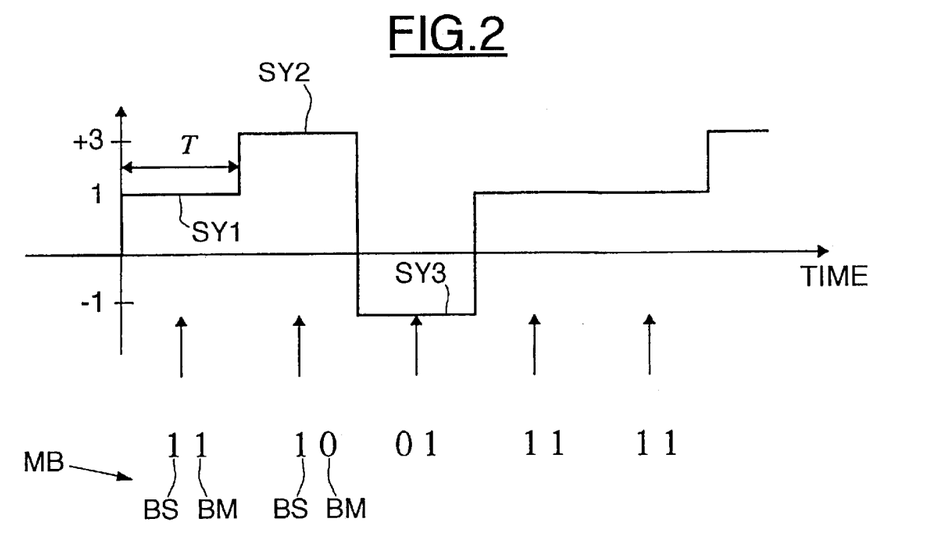
FIG. 2 shows an example of the 2B1Q coding.

As illustrated in FIG. 2, the 2B1Q code associates one of four symbols (or quaternary) +1, +3, −1, −3 (respectively referenced SY1, SY2 and SY3, with the symbol −3 not being represented) with two bits of the binary input information stream MB. Each symbol SYi of the 2B1Q code has a duration T of 12.5 $\mu$s. Stated otherwise, the symbols SYi of the 2B1Q code are delivered at a frequency of 80 KHz. Additionally, each pair of bits extracted from the binary information stream has a first "sign" bit BS, and a second "magnitude" bit BM. Thus, there is a one-to-one correspondence between the values of the sign and magnitude bits and the symbols, as shown in the coding table below.

| Sign | Magnitude | Symbol |
| --- | --- | --- |
| 1 | 0 | +3 |
| 1 | 1 | +1 |
| 0 | 1 | −1 |
| 0 | 0 | −3 |

Figure 3:
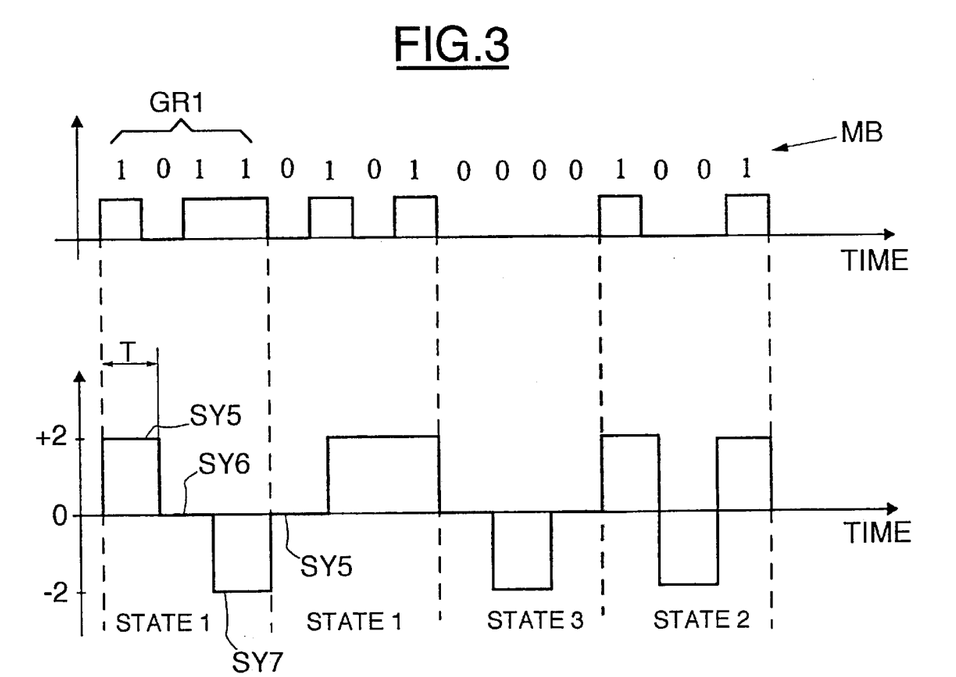
FIG. 3 shows an example of the 4B3T coding.

As illustrated in FIG. 3, the 4B3T coding matches a sequence of three symbols +2, 0, −2 (respectively referenced SY5, SY6 and SY7) with a group GR1 of four bits of the input stream. The correspondence between the bit values of the groups and the sequences of three symbols are fixed as a function of a current state that can take 4 values, as shown in the coding table below.

| bits | state 1 | state 2 | state 3 | state 4 |
| --- | --- | --- | --- | --- |
| 0001 | 0−+ | 0−+ | 0−+ | 0−+ |
| 0111 | −0+ | −0+ | −0+ | −0+ |
| 0100 | −+0 | −+0 | −+0 | −+0 |
| 0010 | +−0 | +−0 | +−0 | +−0 |
| 1011 | +0− | +0− | +0− | +0− |
| 1110 | 0+− | 0+− | 0+− | 0+− |
| 1001 | +−+ | +−+ | +−+ | −−− |
| 0011 | 00+ | 00+ | 00+ | −−0 |
| 1101 | 0+0 | 0+0 | 0+0 | −0− |
| 1000 | +00 | +00 | +00 | 0−− |
| 0110 | −++ | −++ | −−+ | −−+ |
| 1010 | ++− | ++− | +−− | +−− |
| 1111 | ++0 | 00− | 00− | 00− |
| 0000 | +0+ | 0−0 | 0−0 | 0−0 |
| 0101 | 0++ | −00 | −00 | −00 |
| 1100 | +++ | −+− | −+− | −+− |

In the table, the signs 0, −, and + represent the symbols 0, −2 and +2, respectively. Further, the next state $ET_{k+1}$ in the coding table is determined by the sum of the value of the current state $ET_k$ plus the sum of the three symbols currently being coded. For the 4B3T code, the duration T of a symbol is 8.33 ps, so the frequency of delivery of the symbols is 120 KHz.

In order to allow the use of a common shaping filter, there is a pair of bits associated with each symbol of the 4B3T code; the first bit is akin to a sign bit and the second bit is akin to a magnitude bit in the 2B1Q code. More precisely, the correspondence between the sign and magnitudes bits and the symbols of the 4B3T code in the preferred embodiment is illustrated in the table below, which shows the correspondence between the sign and magnitude bits and the symbols of the 2B1Q code.

| Sign | Magnitude | 2B1Q symbol | 4B3T symbol |
| --- | --- | --- | --- |
| 1 | 0 | +3 | 0 |
| 1 | 1 | +1 | +2 |
| 0 | 1 | −1 | −2 |
| 0 | 0 | −3 | 0 |

Figure 4:
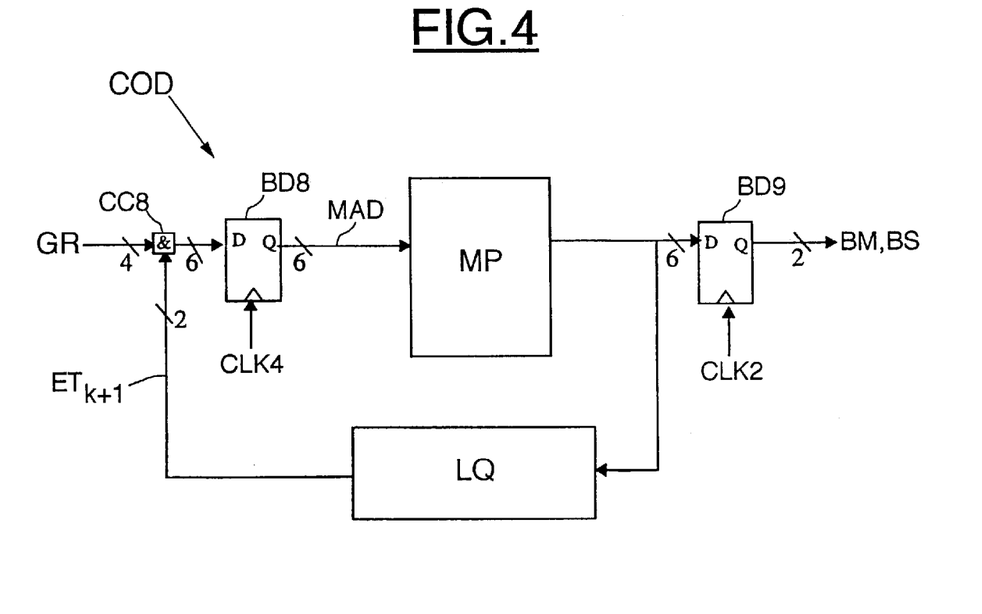
FIG. 4 shows the internal structure of a coder according to an embodiment of the present invention.

In this regard, when the selection signal selects the 4B3T code, the coder COD extracts the successive groups GR of four digital information items from the digital information stream, and delivers in succession (at the frequency of delivery of 120 KHz) three pairs of sign and magnitude bits BM and BS (representative of three symbols of the 4B3T coding) to the shaping filter FMF for each of the groups. More precisely, as illustrated in FIG. 4, the coder COD includes a main memory MP that is addressed by an address word MAD delivered by a D-type flip-flop BD8 under control of clock signal CLK4 whose frequency is one-third of the frequency of clock signal CLK2 corresponding to the 120 KHz frequency of delivery. The clock signals CLK2 and CLK4 are mutually out of phase (i.e., they never have simultaneous rising edges). For example, a phase shift can be used to cause the rising edges of clock signal CLK4 to correspond to the falling edges of clock signal CLK2.

Additionally, the main memory contains, at each address, a 6-bit word containing the values of the three pairs of sign and magnitude bits associated with the corresponding sequence SPB of three symbols. More precisely, according to the preferred embodiment, each address word MAD has two high-order bits representing the state $ET_k$ of the coder and four bits representing the sequence of symbols to be coded. Each sequence of three symbols SPB is stored at the corresponding address by means of the sign bits and magnitude bits according to the correspondence table shown above. Thus, the main memory contains 64 words of 6 bits. The symbols (i.e., the successive pairs of sign and magnitude bits) are sent one-by-one to the shaping filter by the D flip-flop BD9 with each rising edge of clock CLK2.

Moreover, in order to insert the two high-order bits corresponding to the current state of the coder $ET_k$ into each address word MAD, the output of memory MP is looped back through combinational logic LQ and through a concatenation circuit CC8 that receives the group of 4 bits GR and the output from the combinatorial logic LQ. The output of the concatenation circuit is linked to the input of the flip-flop BD8. Because the 4B3T coding requires the insertion at predetermined times of synchronization and maintenance words containing predetermined sequences of symbols, these predetermined sequences of symbols (coded in the form of sign and magnitude bits) are inserted by a multiplexer connected at the output of the flip-flop BD9 (not shown).

Irrespective of the coding used, each symbol is associated with a pulse IMP (see FIG. 5) having a pulse duration TI and a maximum level NVX that substantially corresponds in voltage to the value of the symbol. For example, the symbol +3 of the 2B1Q code is associated with a pulse whose level is substantially equal to +3 volts (e.g., 2.5 volts could be specified). In practice, the transmission standards stipulate a time-frequency template for each pulse present on the telephone line (after the line transformer).

Figure 5:
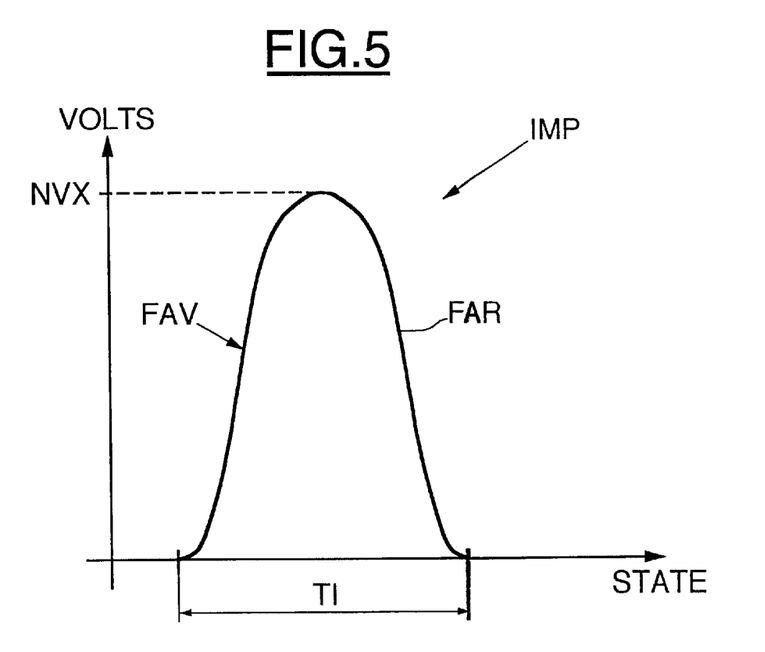
FIG. 5 shows a pulse used in the device of FIG. 1.

Furthermore, irrespective of the type of coding, each symbol corresponds to a pulse that has symmetric front FAV and rear FAR edges (rising and falling edges in the case of a positive pulse) extending over the first half and second half of the pulse duration TI. For example, the mathematical function that determines the shape of the rear edge of the pulse IMP can be a raised cosinusoid function elevated to the power 4, of formula:

$$\left(\frac{1}{2}(1+\cos\pi t)\right)^4$$

The mathematical function for the rising edge of the pulse is then equal to the difference between this cosinusoid function and 1, for a pulse whose level is normalized to 1. In general, integer powers from 1 to 6 are possible. In the preferred embodiment, the power 4 is used because it gives the best compromise between the steepness of the edges of the pulse and the position of the latter inside the normalized template. Further, the pulse IMP is delivered to the primary of the line transformer and the duration TI of this pulse is equal to twice the duration of the symbol. Thus, the pulses corresponding to the symbols of the 2B1Q code have a width TI of 25 $\mu$s, and the pulses corresponding to the symbols of the 4B3T code have a width TI of 16.66 $\mu$s.

Figure 6:
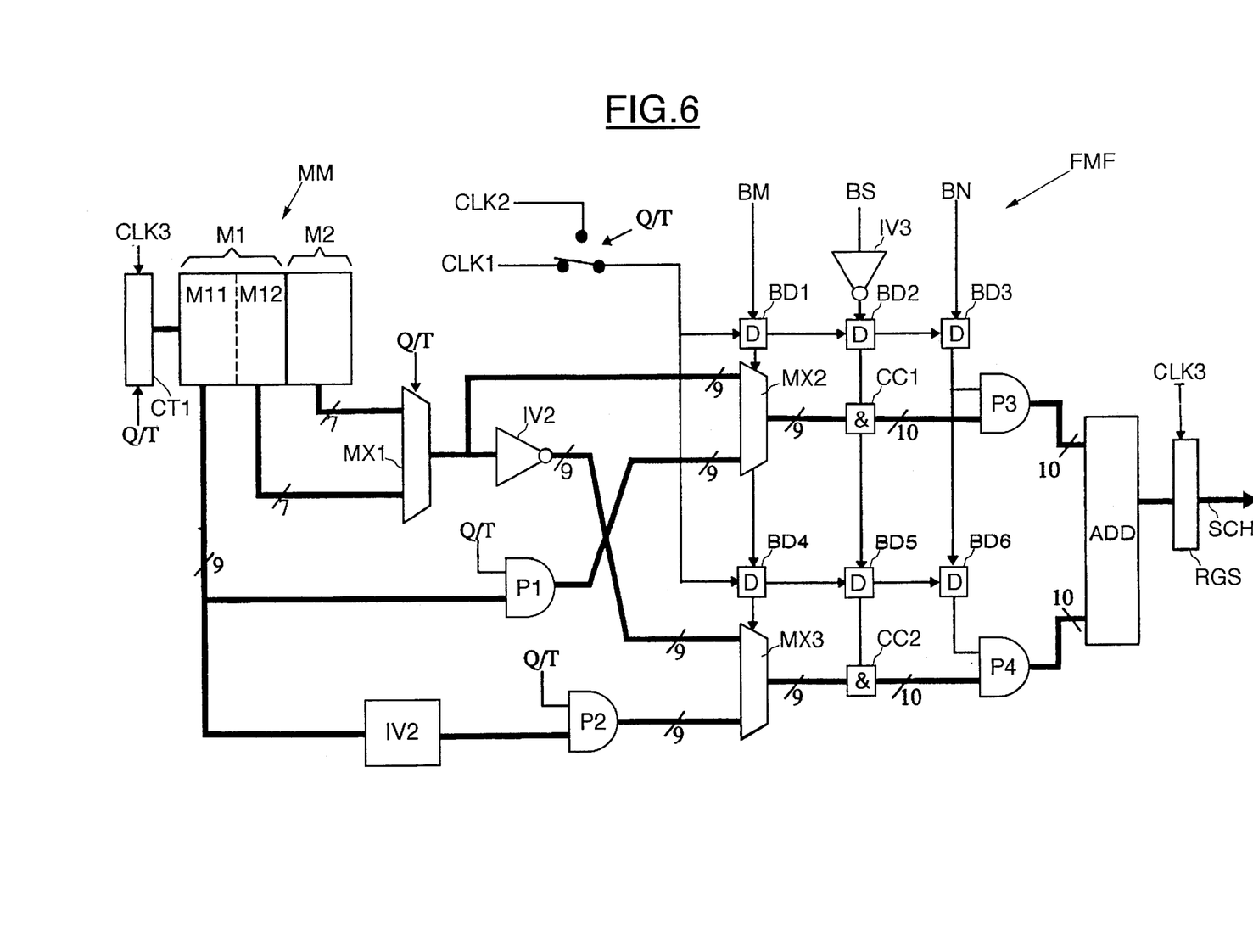
FIG. 6 shows the internal structure of a common shaping filter according to an embodiment of the present invention.

The internal structure of the shaping filter FMF will now be described in greater detail with reference to FIG. 6. The filter includes a read-only memory MM that is functionally divided into a first memory M1 and a second memory M2, and the first memory M1 is further functionally divided into a first part M11 and a second part M12. A counter CT1 clocked at a reading frequency (or addressing frequency) CLK3 (e.g., 1.92 MHz) addresses the memory MM. The counter is controlled by the selection signal Q/T. The output of the second memory M2 and the output of the second part M12 of the first memory M1 are linked to the two inputs of a multiplexer MX1, which is controlled by the selection signal Q/T. The output of the multiplexer MX1 is linked to a first input of another multiplexer MX2 and to a first input of a third multiplexer MX3 via a logic inverter IV2.

The output of the first part M11 of the first memory M1 is linked to the second input of the multiplexer MX2 via an AND logic gate P1, which also receives the selection logic signal Q/T. The output of the first part M11 of the memory M1 is also linked to the second input of the multiplexer MX3 via an inverter IV1 and via an AND logic gate referenced P2. The AND logic gate P2 also receives the selection logic signal Q/T. The output of the multiplexer MX2 is linked to a first input of an adder ADD via the first concatenation circuit CC1 and an AND logic gate. Similarly, the output of the multiplexer MX3 is linked to the second input of the adder ADD via a second concatenation circuit CC2 and an AND logic gate.

The multiplexer MX2 is controlled by the magnitude bits BM delivered by a D-type flip-flop BD1 and at the tempo of the clock signal CLK1 or CLK2 (corresponding to the first and second frequencies of delivery, for example, 80 KHz and 120 KHz) as a function of the value of the selection signal Q/T (i.e., as a function of the type of coding selected). The multiplexer MX3 is likewise controlled by the successive magnitude bits BM after they are delayed by one cycle of the clock CLK1 or CLK2 by another D-type flip-flop BD4.

The first concatenation circuit CC1 also receives the sign bits BS inverted by an inverter IV3 and delivered by a D flip-flop BD2, which is likewise controlled by the clock signal CLK1 or CLK2. By analogy, the second concatenation circuit CC2 also receives the sign bits inverted and then delayed by one cycle of the clock CLK1 or CLK2 by another D flip-flop BD5. Two other D-type flip-flops BD3 and BD6 deliver at the frequency CLK1 or CLK2 bits of predetermined value BN on the second input of the logic gate P3, and the same bits delayed by one clock cycle on the second input of the logic gate P4. This makes it possible to carry out filter test modes. An output register RGS, which is controlled by the clock signal CLK3 (at, for example, 1.92 MHz), delivers the various samples of the sampled signal SCH.

Figure 7:
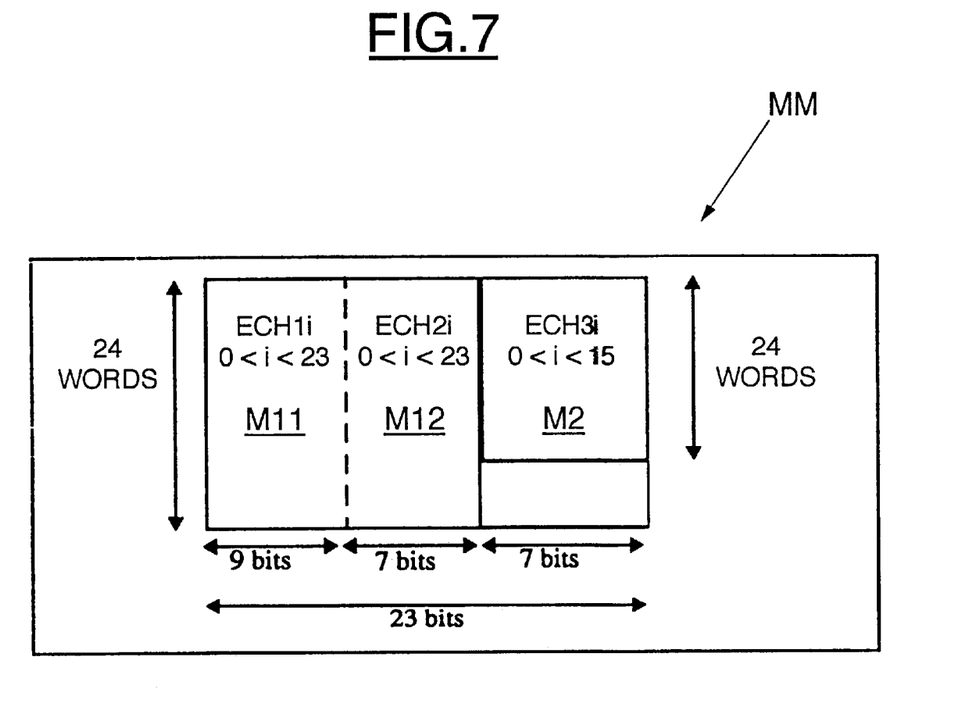
FIG. 7 shows the internal configuration of a memory for storing digital samples according to an embodiment of the present invention.

The operation of the shaping filter FMF will now be described with reference to FIGS. 6 and 7. In some embodiments, the filter FMF has a memory MM that stores all of the digital samples associated with all the pulses of all the symbols of the two types of coding. However, in the preferred embodiment, the memory stores the samples corresponding to the front edge (rising edge) of the pulse associated with the symbol +3 of the 2B1Q code in the first part M11 of the memory M1, the samples of the rising edge of the pulse associated with the symbol +1 of the 2B1Q code in the second part M12 of the first memory M1, and the samples corresponding to the rising edge of a pulse reduced by half in amplitude with respect to the pulse associated with the symbol +2 of the 4B3T code in the memory M2.

Given that the addressing (or reading) frequency is the same for the two types of coding (e.g., 1.92 MHz), that the same basic function has been used to obtain the digital samples stored in the memory MM, and that the frequency of delivery of the symbols of the two types of coding is not the same, the number of samples stored in the first or second part of the first memory M1 is different from the number of samples stored in the second memory M2. More precisely, as illustrated in FIG. 7, the first part M11 of the first memory contains 24 samples ECH1i forming 24 words of 9 bits, and the second part M12 of the first memory also contains 24 samples ECH2i forming 24 words of 7 bits. On the other hand, the second memory M2 contains 16 samples ECH3i formed by 16 words of 7 bits. Therefore, the counter CT1 counts from 0 to 23 or from 0 to 15 depending on the value of the selection signal Q/T.

During operation, the multiplexer chooses the samples corresponding either to the symbol +1 of the 2B1Q code or the symbol +2 of the 4B3T code depending on the value of the selection signal Q/T. Then, the inverter IV2 reconstructs the falling edges of the corresponding pulses by a bit-by-bit inversion. It should be noted that this bit-by-bit inversion makes it possible to obtain the falling edge because of the coding of the maximum dynamic range of the samples on 7 bits. Moreover, given that the words corresponding to the samples stored in the first part M11 of the memory M1 are coded on 9 bits, the 7-bit words will be padded out with the 2B1Q samples by appending 2 zero (0) high-order bits. Moreover, the samples corresponding to the rising edge of the pulse of the 4B3T code with reduced amplitude +1 have also been stored on 7-bit words. A left shift of these words is also performed at the output of the multiplexer MX1 or at the output of the inverter IV2 so as to perform a multiplication by two.

The logic gates P1 and P2 choose, depending on the value of the signal Q/T, the symbol +3 of the 2B1Q code or the symbol 0 of the 4B3T code (the latter symbol being obtained by delivering zero values to the inputs of the multiplexers MX2 and MX3). The inverter IV1 reconstructs the falling edge of the +3 pulse of the 2B1Q code. Thus, because the maximum level of the +3 pulse is not coded on a sequence of bits which are all equal to 1, it has not been possible to use a conventional bit-by-bit inverter. The inverter IV1 performs the operation 381—ECH1i. Thus, the inverters IV2 and IV1 reconstruct the falling edges FAR of the pulses of positive polarity, only the rising edges FAV of which have been stored in the memory MM.

The value of the magnitude bit BM, which directly controls the multiplexers MX2 and MX3, chooses between the pulses corresponding either to the symbols +1 and −1 of the 2B1Q code or to the symbols +2 and −2 of the 4B3T code, or else to the symbols +3 and −3 of the 2B1Q code or the zero symbol of the 4B3T code. The sign bit BS inverted by the inverter IV3 is concatenated on the left of the word delivered by the multiplexers MX2 and MX3 to sign the word (to choose between the pulses corresponding to the positive symbols or between the pulses corresponding to the negative symbols). The pulses corresponding to the negative symbols are thus reconstructed from the samples contained in the memory MM.

The flip-flops BD4, BD5, and BD6, the multiplexer MX3, the concatenation circuit CC2, and the gate P4 preserve in memory the rear edges corresponding to the pulse of the preceding symbol. These stored samples are next added to the samples corresponding to the front edge of the pulse of the current symbol. Each frequency of delivery of the symbols (80 KHz or 120 KHz) corresponds to a time period of delivery (symbol duration) equal to half of the time duration of the pulses of the type of coding selected. After storage in the output register RGS, the various samples of the digital signal SCH are delivered at the frequency CLK3. The values of the magnitude and sign bits BM and BS are refreshed at either the 80 KHz frequency (for the 2B1Q code) or the 120 KHz frequency (for the 4B3T code).

While the invention has been described above with reference to an embodiment in which the transmission of digital information is done within the context of a digital network of universal character (i.e., ISDN), it is not limited in its principle to such a network. Similarly, the explanation with respect to the 2B1Q and 4B3T communications protocols and their corresponding operating frequencies is given purely by way of illustration and is in no way meant to restrict the scope of the invention. Furthermore, embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for the baseband transcoding of a stream of digital information for transmission within an analog signal that is formed using pulses associated with coding symbols, said method comprising the steps of:

storing first digital samples in a first memory, the first digital samples representing at least part of the pulses associated with symbols of a first type of coding;

storing second digital samples in a second memory, the second digital samples representing at least part of the pulses associated with symbols of a second type of coding;

selecting either the first type of coding or the second type of coding for the transmission;

if the first type of coding is selected, performing a first coding process that includes the steps of:
   extracting pairs of bits from the stream of digital information; and
   delivering the pairs of bits at a first frequency, each delivered pair of bits corresponding to one of the symbols of the first type of coding;

if the second type of coding is selected, performing a second coding process that includes the steps of:
   processing bits from the stream of digital information; and
   delivering corresponding symbols of the second type of coding at a second frequency, each symbol of the second type of coding being delivered as a pair of bits;

reading the digital samples from the first or second memory at a third frequency based on the type of coding selected and the value of the delivered pair of bits; and generating a digital output signal from the read digital samples, the digital output signal being representative of the analog signal to be transmitted.

2. The method as defined in claim 1, wherein the first type of coding has four symbols that correspond to a low-level positive voltage pulse, a low-level negative voltage pulse, a high-level positive voltage pulse, and a high-level negative voltage pulse, and the second type of coding has three symbols that correspond to a positive voltage pulse, a negative voltage pulse, and a zero-level voltage pulse.

3. The method as defined in claim 2,
wherein each delivered pair of bits consists of a sign bit and a magnitude bit,
for the first type of coding, a positive pulse or a negative pulse is selected on the basis of the value of the sign bit, and a low-level pulse or a high-level pulse is selected on the basis of the value of the magnitude bit, and
for the second type of coding, a zero-level pulse or a non-zero-level pulse is selected on the basis of the value of one of the sign bit and magnitude bit, and for the non-zero-level pulses, a positive pulse or a voltage pulse is selected on the basis of the value of the other of the bits.

4. The method as defined in claim 1, further comprising the step of obtaining the digital samples that are stored in the first memory and the digital samples that are stored in the second memory by using two different samplings of the same mathematical function.

5. The method as defined in claim 4, wherein the mathematical function is a cosinusoid raised to an integer power.

6. The method as defined in claim 1,
wherein the product of the first frequency times the number of stored digital samples for a pulse of the first type of coding is equal to the third frequency, and
the product of the second frequency times the number of stored digital samples for a pulse of the second type of coding is equal to the third frequency.

7. The method as defined in claim 1,
wherein the pulses for the symbols of the first type of coding each have a first time duration,
the pulses for the symbols of the second type of coding each have a second time duration, which is different from the first time duration,
the first frequency corresponds to a time period equal to half the first time duration, and
the second frequency corresponds to a time period equal to half the second time duration.

8. The method as defined in claim 1, wherein the digital output signal is generated by adding together the digital samples for a current symbol and a preceding symbol at the third frequency.

9. A device for the baseband transcoding of digital information for transmission within an analog signal that is formed by pulses associated with coding symbols, said device comprising:
a first memory storing first digital samples representative of at least part of the pulses associated with the symbols of a first type of coding;
a second memory storing second digital samples representative of at least part of the pulses associated with the symbols of a second type of coding;
a preprocessing circuit; and
a shaping filter that reads digital samples from either the first or the second memory at a first frequency on the basis of a selected type of coding and values of sign bits and magnitude bits, and that generates a digital output signal from the read digital samples, the digital output signal being representative of the analog signal to be transmitted,
wherein when the first type of coding is selected, the preprocessing circuit extracts pairs of bits from the digital information and outputs the pairs of bits to the shaping filter at a second frequency, each output pair of bits representing one of the symbols of the first type of coding and being one sign bit and one magnitude bit, and
when the second type of coding is selected, the preprocessing circuit processes the digital information and outputs symbols of the second type of coding at a third frequency, each symbol of the second type of coding being represented by a pair of bits that has one sign bit and one magnitude bit.

10. The device as defined in claim 9, wherein the digital samples stored in the first memory and the digital samples stored in the second memory are obtained using two different samplings of the same mathematical function.

11. The device as defined in claim 9,
wherein the product of the second frequency times the number of stored digital samples for a pulse of the first type of coding is equal to the first frequency, and
the product of the third frequency times the number of stored digital samples for a pulse of the second type of coding is equal to the first frequency.

12. The device as defined in claim 9,
wherein the pulses corresponding to the symbols of the first type of coding each have a first time duration, and
the pulses corresponding to the symbols of the second type of coding each have a second time duration, which is different from the first time duration.

13. The device as defined in claim 12,
wherein each non-zero pulse has symmetric front and rear edges that extend over first and second halves of the corresponding time duration,
the first and second memories only store samples for one of the two edges of each non-zero pulse, and
the shaping filter includes a reconstruction circuit that generates samples for the other edge of each non-zero pulse.

14. The device as defined in claim 13,
wherein the first and second memories only store samples for one of positive non-zero pulses and negative non-zero pulses, and
the reconstruction circuit generates samples for the other of the non-zero pulses.

15. The device as defined in claim 12,
wherein the pulses for the symbols of the first type of coding each have a first time duration,
the pulses for the symbols of the second type of coding each have a second time duration, which is different from the first time duration,
the second frequency corresponds to a time period equal to half the first time duration, and
the third frequency corresponds to a time period equal to half the second time duration.

16. The device as defined in claim 15, wherein the shaping filter generates the digital output signal by adding together the digital samples for a current symbol and a preceding symbol at the first frequency.

17. The device as defined in claim 9,
wherein the first type of coding has four symbols that correspond to a low-level positive voltage pulse, a low-level negative voltage pulse, a high-level positive voltage pulse, and a high-level negative voltage pulse, and
the second type of coding has three symbols that correspond to a positive voltage pulse, a negative voltage pulse, and a zero-level voltage pulse.

18. The device as defined in claim 17,
wherein for the first type of coding, a positive pulse or a negative pulse is selected on the basis of the value of the sign bit, and a low-level pulse or a high-level pulse is selected on the basis of the value of the magnitude bit, and for the second type of coding, a zero-level pulse or a non-zero-level pulse is selected on the basis of the value of one of the sign bit and magnitude bit, and for the non-zero-level pulses, a positive pulse or a voltage pulse is selected on the basis of the value of the other of the bits.

19. The device as defined in claim 18, wherein the first memory includes:
- a first part that stores samples for a front edge of the high-level positive pulse; and
- a second part that stores samples for a front edge of the low-level positive pulse;

the second memory stores samples for a front edge of the positive pulse of the second type of coding; and the reconstruction circuit includes:
- a first inverter coupled to the output of the first part of the first memory, and a second inverter coupled to the output of the second part of the first memory and to the output of the second memory, each of the inverters generating samples for the rear edge of one of the pulses;
- a first concatenation circuit that receives inverted sign bits; and
- a second concatenation circuit coupled to the outputs of the first and second inverters, the second concatenation circuit receiving inverted sign bits that have been delayed.

20. The device as defined in claim 19, wherein the shaping filter includes:
- a first multiplexer that is controlled by a selection signal;
- a second multiplexer having a first input that receives the output of the second part of the first memory or the output of the second memory via the first multiplexer, and a second input that receives the output of the first part of the first memory via a first AND gate, which also receives the selection signal, the second multiplexer being controlled by the magnitude bits;
- a third multiplexer having a first input that receives the output of the second inverter, and a second input that receives the output of the first inverter via a second AND gate, which also receives the selection signal, the third multiplexer being controlled by the magnitude bits; and
- an adder that generates the digital output signal, the adder having a first input that receives the output of the second multiplexer via the first concatenation circuit, and a second input that receives the output of the third multiplexer via the second concatenation circuit.

21. The device as defined in claim 9, wherein the preprocessing circuit includes:
- a serial/parallel conversion circuit that, when the first type of coding is selected, receives the input digital information and supplies pairs of sign and magnitude bits to the shaping filter at the second frequency; and
- a coder that, when the second type of coding is selected, extracts groups of at least three bits from the input digital information and supplies pairs of sign and magnitude bits to the shaping filter at the third frequency such that for each group of bits, at least two pairs of sign and magnitude bits are supplied to the shaping filter.

22. The device as defined in claim 21, wherein the coder includes:
- a main memory addressable by an address word that includes a group of bits, each memory location storing values for the pairs of sign and magnitude bits corresponding to the sequence of symbols of the second type of coding for one group of bits;
- an addressing circuit that addresses the main memory at a fourth frequency equal to one third of the third frequency; and
- a reading circuit that delivers the pairs of sign and magnitude bits at the third frequency, wherein the clock signals corresponding to the third frequency and the fourth frequency are mutually out of phase.

\* \* \* \* \*

UNITED STATES PATENT AND TRADEMARK OFFICE
CERTIFICATE OF CORRECTION

PATENT NO. : 6,307,864 B1  Page 1 of 1
DATED : October 23, 2001
INVENTOR(S) : Thierry Fensch et al.

It is certified that error appears in the above-identified patent and that said Letters Patent is hereby corrected as shown below:

<u>Title page,</u>
Please add the following: -- *Attorney, Agent, or Firm* - Theodore E. Galanthay; Stephen Bongini; Fleit, Kain, Gibbons, Gutman & Bongini P.L. --

Signed and Sealed this

Thirteenth Day of August, 2002

*Attest:*

*Attesting Officer*

JAMES E. ROGAN
*Director of the United States Patent and Trademark Office*